United States Patent
Gonda

(10) Patent No.: US 7,586,941 B2
(45) Date of Patent: Sep. 8, 2009

(54) METHOD AND APPARATUS FOR TRANSLATING SDH/SONET FRAMES TO ETHERNET FRAMES

(76) Inventor: Rumi S. Gonda, 106 Steele La., Boxborough, MA (US) 01719

( * ) Notice: Subject to any disclaimer, the term of this patent is extended or adjusted under 35 U.S.C. 154(b) by 993 days.

(21) Appl. No.: 10/228,502

(22) Filed: Aug. 26, 2002

(65) Prior Publication Data

US 2003/0056017 A1  Mar. 20, 2003

Related U.S. Application Data

(60) Provisional application No. 60/314,801, filed on Aug. 24, 2001.

(51) Int. Cl.
*H04J 3/16* (2006.01)
*H04L 12/56* (2006.01)
(52) U.S. Cl. ............................... 370/466; 370/401
(58) Field of Classification Search .............. None
See application file for complete search history.

(56) References Cited

U.S. PATENT DOCUMENTS

| | | | |
|---|---|---|---|
| 5,533,018 A | 7/1996 | DeJager et al. .............. 370/60.1 |
| 5,535,338 A | 7/1996 | Krause et al. | |
| 5,844,903 A | 12/1998 | Terashita et al. ............. 370/403 |
| 5,867,502 A * | 2/1999 | Chang ........................ 370/477 |
| 6,014,708 A * | 1/2000 | Klish ......................... 709/232 |
| 6,058,479 A | 5/2000 | Sørhaug et al. ............. 713/193 |
| 6,108,345 A | 8/2000 | Zhang ........................ 370/445 |
| 6,122,281 A * | 9/2000 | Donovan et al. ............. 370/401 |
| 6,137,799 A | 10/2000 | Karapetkov et al. ......... 370/395 |
| 6,151,336 A | 11/2000 | Cheng et al. ................. 370/535 |
| 6,195,332 B1 * | 2/2001 | Tang .......................... 370/232 |
| 6,320,863 B1 | 11/2001 | Ramfelt ...................... 370/404 |
| 6,345,310 B1 | 2/2002 | Allison et al. ............... 709/250 |
| 6,414,966 B1 * | 7/2002 | Kulkarni et al. ............. 370/465 |
| 6,469,983 B2 | 10/2002 | Narayana et al. ............ 370/231 |
| 6,658,480 B2 * | 12/2003 | Boucher et al. ............. 709/239 |
| 6,704,326 B2 * | 3/2004 | Russell et al. ............... 370/466 |

(Continued)

FOREIGN PATENT DOCUMENTS

WO  WO-98/43396 A1  10/1998

(Continued)

OTHER PUBLICATIONS

10 Gigabite Ethernet Alliance "10 Gigabit Ethernet Technology Overview White Paper—Revision 2, Draft A", pp. 1-16 (Apr. 2002).

(Continued)

*Primary Examiner*—Chi H Pham
*Assistant Examiner*—Warner Wong
(74) *Attorney, Agent, or Firm*—Lahive & Cockfield, LLP

(57) ABSTRACT

A translation engine is provided for efficiently translating SDH/SONET frames to Ethernet frames and vice versa. In accordance with one embodiment, a translation system includes a buffer for holding SDH/SONET and Ethernet frames. An Ethernet Media Access Control (MAC) address for a corresponding SDH/SONET TDM slot is further provided. A translation engine for translating SDH/SONET frames into Ethernet frames is in communication with an output interface. The SDH/SONET payload is sent through a translation engine to translate the SDH/SONET payload into an Ethernet payload. For translating from Ethernet to SDH/SONET, a reverse process occurs.

32 Claims, 4 Drawing Sheets

U.S. PATENT DOCUMENTS

| | | | | |
|---|---|---|---|---|
| 6,804,233 | B1* | 10/2004 | Congdon et al. | 370/389 |
| 6,842,453 | B1* | 1/2005 | Kloth et al. | 370/392 |
| 6,870,877 | B2* | 3/2005 | Notani | 375/221 |
| 6,898,213 | B1* | 5/2005 | Shimelmitz et al. | 370/537 |
| 6,944,163 | B2* | 9/2005 | Bottorff et al. | 370/395.5 |
| 6,963,561 | B1* | 11/2005 | Lahat | 370/356 |
| 6,996,125 | B2* | 2/2006 | Kfir et al. | 370/466 |
| 7,002,967 | B2* | 2/2006 | Denton et al. | 370/395.5 |
| 7,031,324 | B1* | 4/2006 | Goody | 370/401 |
| 7,031,341 | B2* | 4/2006 | Yu | 370/469 |
| 7,042,892 | B2* | 5/2006 | Young et al. | 370/419 |
| 7,106,746 | B1* | 9/2006 | Dorbolo | 370/395.51 |
| 7,227,844 | B1* | 6/2007 | Hall et al. | 370/242 |
| 2001/0037406 | A1* | 11/2001 | Philbrick et al. | 709/250 |
| 2001/0043603 | A1* | 11/2001 | Yu | 370/393 |
| 2002/0001302 | A1 | 1/2002 | Pickett | 370/352 |
| 2002/0037018 | A1* | 3/2002 | Lentine et al. | 370/521 |
| 2002/0075542 | A1 | 6/2002 | Kumar et al. | 359/135 |
| 2002/0075819 | A1 | 6/2002 | Kumar et al. | 370/294 |
| 2002/0075854 | A1 | 6/2002 | Kumar et al. | 370/352 |
| 2002/0075869 | A1 | 6/2002 | Shah et al. | 370/389 |
| 2002/0085565 | A1 | 7/2002 | Ku et al. | 370/395.42 |
| 2002/0176389 | A1* | 11/2002 | Colombo et al. | 370/338 |
| 2002/0176450 | A1* | 11/2002 | Kong et al. | 370/539 |
| 2002/0181493 | A1* | 12/2002 | Bamba | 370/463 |
| 2002/0181499 | A1* | 12/2002 | Kfir et al. | 370/466 |
| 2003/0021287 | A1 | 1/2003 | Lee et al. | 370/442 |
| 2003/0046706 | A1* | 3/2003 | Rakib | 725/111 |

FOREIGN PATENT DOCUMENTS

| | | | |
|---|---|---|---|
| WO | WO-00/74282 | A2 | 12/2000 |

OTHER PUBLICATIONS

Malis, A.G. et al. "SONET/SDH Circuit Emulation over Packet (CEP)", retrieved from http://www.ietf.org/internet-drafts/draft-ietf-pwe3-sonet-00.txt, 33 pages (Jul. 2002).

Martini, L. et al. "Encapsulation Methods for Transport of Ethernet Frames Over IP and MPLS Networks", retrieved from http://www.ietf.org/internet-drafts/draft-martini-ethernet-encap-mpls-01.txt, 22 pages (Nov. 2001).

ITU-T Study Group 15 "11: VC concatenation" from *ITU-T Recommendation G.707/Y.1322: Network node interface for the synchronous digital hierarchy (SDH)* International Telecommunication Union, 14 pages (Oct. 2000).

ITU-T Study Group *15 ITU-T Recommendation G.707/Y.1322: Network node interface for the synchronous digital hierarchy (SDH), Amendment 1* International Telecommunication Union, 9 pages (Nov. 2001).

Seifert, Rich, *The Switch Book, The Complete Guide to LAN Switching Technology*, Wiley Computer Publishing, John Wiley & Sons, Inc., pp. 109, 116-118 (2000).

* cited by examiner

METHOD AND APPARATUS FOR TRANSLATING SDH/SONET FRAMES TO ETHERNET FRAMES

RELATED APPLICATIONS

This application claims priority to U.S. Provisional Application Ser. No. 60/314,801, filed on Aug. 24, 2001, the contents of which are incorporated herein in their entirety by reference.

FIELD OF THE INVENTION

The present invention relates to a network switching architecture, and more particularly to mapping or translating of SDH/SONET framing to Ethernet Framing and vice versa.

BACKGROUND OF THE INVENTION

A number of Metropolitan Area Networks (MAN) and Wide Area Networks (WAN) utilize a Time Division Multiplexing (TDM) Synchronous Optical Network (SONET) network architecture, or a Synchronous Digital Hierarchy (SDH) network architecture. In contrast, a number of Local Area Networks (LANs) utilize an Ethernet network architecture.

The SDH/SONET standards evolved originally for use in a voice network. SDH is a European version of a standard that is substantially the same as the SONET standard developed in North America. SDH/SONET contains connection oriented synchronous TDM circuit switching technology. An SDH/SONET configured network runs at the same clock domain (e.g., every section of the network can be traced to a primary clock reference). The network allocates fixed bandwidth time slots for each circuit. The SDH/SONET architectures are connection based protocols in that there is a physical circuit arrangement between ports in a switch to establish an end to end path. The digital transmissions in signals traveling through an SDH/SONET network occur at the same rate, however there may be a phase difference between the transmissions of any two signals caused by time delays or jitter in the transmission system.

Ethernet evolved primarily as a data network. In contrast to SDH/SONET, Ethernet is a connectionless asynchronous Collision Sense, Multiple Access with Collision Detection (CSMA/CD) packet switching technology. The Ethernet architecture does not rely on a single clock domain like the SDH/SONET architecture. The Ethernet architecture sends a series of packets across the network containing data. Whenever a packet needs to be sent, the transmitter will try to transmit the packet. The Ethernet architecture is also connectionless in that the packets travel from node to node within the network without establishing a physical or logical circuit. The end to end path is discovered through a process called "Bridging". Ethernet is fundamentally a Local Area Network (LAN) technology.

SDH/SONET networks provide reliable, guaranteed available bandwidth, low jitter connections. These characteristics are required for voice quality networks. SDH/SONET, however, is bandwidth inefficient and has a higher overhead than many other network architectures. Ethernet networks, in contrast, provide lower reliability best effort delivery, and low cost bandwidth connections. These characteristics are suitable for data quality networks. Ethernet has non-guaranteed transmission and low overhead, and supports fewer operational functions than SDH/SONET. In SDH/SONET, once the circuit is established, bandwidth is allocated for an application and cannot be used by any other application, even if the original application is not using the bandwidth. In Ethernet, applications only use bandwidth when they need the bandwidth to transmit packets.

A known approach of transforming Ethernet data traffic into SDH/SONET is to encapsulate or tunnel the data into SDH/SONET data traffic. Encapsulation entails taking data provided by a higher-layer entity as the payload for a lower-layer entity, and applying a header and a trailer as dictated by the protocol. The encapsulation process places the data payload into a frame for transmission.

A tunnel is a mechanism for encapsulating one protocol within another. A tunnel is used to transport information between devices using one form of communication across an infrastructure that only supports a different form, without translating from the first protocol to the second. Several standards are known for tunneling, such as RFC 2651, PPP over SONET/SDH, ITU-T Recommendation X.85/Y.1321, IP over SDH using LAPS, ITU-T Pre-published Recommendation X.86, Ethernet Over LAPS and IEEE Draft P802.3ae. There are also several proposals for Virtual Concatenation Extensions to SDH/SONET Standards, however no single standard has been established.

In encapsulation methods, a complete original frame is packed into an encapsulating frame. When this is done, overhead bytes of both frames are transmitted. This means that encapsulation is less efficient with regard to the use of overhead bandwidth. Current methods of encapsulation are also restricted to support only concatenated SDH/SONET frames. They provide only one single "pipe" to connect to LAN networks.

Current methods of encapsulation focus on converting Ethernet over SONET. Thus, the methods have the same bandwidth inefficiency problem that SDH/SONET networks have, in that bandwidth is allocated even if there is no traffic being transmitted over the SDH/SONET port.

Further, in encapsulation, both ends of the circuit have to be of the same port type. In addition, when encapsulating, the encapsulating protocol must support data field length larger than that of the protocol being encapsulated.

SUMMARY OF THE INVENTION

There is a need in the art for a translation engine for more efficiently translating Ethernet frames to SDH/SONET frames and vice versa. The present invention is directed toward further solutions to address this need.

In accordance with one embodiment of the present invention, a translation system for translation between SDH/SONET frames and Ethernet frames is provided. The system includes a buffer for holding SDH/SONET frames. An Ethernet Media Access Control (MAC) address for a corresponding SDH/SONET TDM slot is further provided. A translation engine for translating SDH/SONET frames into Ethernet frames is in communication with an output interface.

In accordance with example embodiments of the present invention, the translation system further includes an add/drop mechanism in communication with the SDH/SONET frames for adding or dropping frame overhead bytes. The add/drop mechanism can be in the form of an ASIC, a Field Programmable Gate Array (FPGA), or a Network Processor.

In accordance with example embodiments of the present invention, the translation engine can include an ASIC, FPGA, and/or a Network Processor in communication with an SDH/SONET Framer, Ethernet MAC hardware, Ethernet physical hardware, and buffer logic to move the SDH/SONET frames and the Ethernet frames to and from the SDH/SONET Framer and the Ethernet MAC hardware.

In accordance with further aspects of the present invention, the Ethernet MAC hardware is modified to allow for multiple unique Ethernet MAC addresses. The Ethernet MAC hardware allows frames to travel therethrough without changing Source MAC Address or Destination MAC Address fields. Further, the payload data can include SDH/SONET traffic that is channelized and/or concatenated.

In accordance with another embodiment of the present invention, a translation system for translation between Ethernet frames and SDH/SONET frames includes a buffer for holding Ethernet frames. An Ethernet MAC address is provided for a corresponding SDH/SONET TDM slot. A translation engine for translating Ethernet frames into SDH/SONET frames also communicates with an output interface.

In accordance with still another embodiment of the present invention, a method of translating payload data from SDH/SONET frames to Ethernet frames is provided. The method includes providing an SDH/SONET payload. The SDH/SONET payload is sent through a translation engine to translate the SDH/SONET payload into an Ethernet payload.

In accordance with one aspect of the present invention, the SDH/SONET payload passes through a buffer.

In accordance with yet another embodiment of the present invention, a method of translating payload data Ethernet frames to SDH/SONET frames is provided. The method includes providing an Ethernet payload. The Ethernet payload is sent through a translation engine to translate the Ethernet payload into an SDH/SONET payload.

In accordance with further aspects of the present invention, the translation engine includes an ASIC, FPGA, and/or a Network Processor in communication with an SDH/SONET Framer, Ethernet MAC hardware, Ethernet physical hardware, and buffer logic to move the payload data to and from the SDH/SONET Framer and the Ethernet MAC hardware.

BRIEF DESCRIPTION OF THE DRAWINGS

The features and aspects of the present invention will become better understood with regard to the following description and accompanying drawings, wherein.

DETAILED DESCRIPTION

Figure 1:
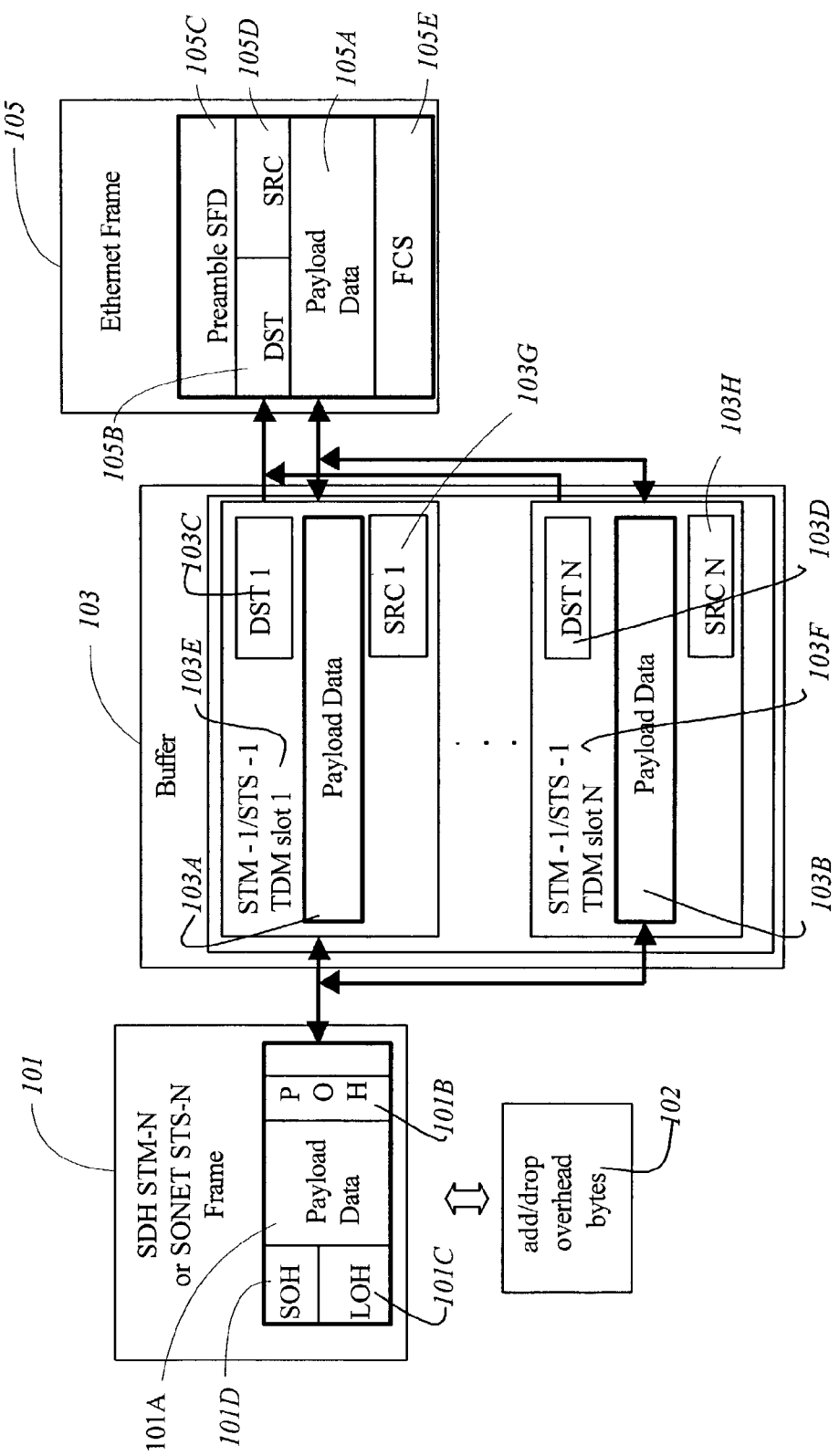
FIG. 1 illustrates the translation of a SDH/SONET frame into an Ethernet Frame, in the illustrative embodiments of the present invention.

An illustrative embodiment of the present invention relates to the conversion of SDH/SONET frames to Ethernet frames, and vice versa. It is desirable to enable voice networks to transmit data and data networks to transmit voice signals. Ethernet is a known network technology for the transmission of data signals, while SDH/SONET is a known network technology for voice transmission. As technology evolves, there are increasing demands for sending voice over Ethernet architectures, and data over SDH/SONET architectures. Hence, there is a need to provide translation between SDH/SONET and Ethernet.

As utilized herein, translation is a process of mapping of Ethernet MAC addresses to corresponding SDH/SONET TDM slots, and the conversion of the SDH/SONET frames to and from Ethernet frames. The translation can include support for SDH/SONET payload and overhead.

The teachings of the present invention provide a mechanism to map SDH/SONET TDM slots to Ethernet source and destination MAC addresses. The present invention provides the infrastructure to support translation of channelized or concatenated SDH/SONET TDM circuits, SDH/SONET Asynchronous Transfer Mode (ATM) circuits and Packet Over SONET (POS) circuits. The teachings of the present invention enable SDH/SONET TDM emulation services on Ethernet networks.

In order to appreciate operation of the illustrative embodiments described herein, it is helpful to understand the Open Systems Interconnect (OSI) network hierarchy, which views a network as being composed of several hierarchical layers. In the hierarchy, Layer 1 is the physical layer containing elements that perform the transmission of signals within the network. Layer 2 is the data link layer, which provides services that allow direct communication between devices across the underlying physical channel of Layer 1. Layer 3 is the network layer, which is responsible for station-to-station data delivery over multiple data links. The network layer is responsible for the routing of packets across the network. Layer 4 is the transport layer, which provides an error-free, sequenced, guaranteed delivery, message service that allows process to process communication between stations on a network. Layer 5 is the session layer, which deals with the establishment of communications between applications. This layer is useful for security applications. Layer 6 is the presentation layer, which enables the sharing of data between networked systems using different methods of local data representation. Finally, Layer 7 is the application layer. This layer provides generic application functions, such as email, file transfer capability, and the like.

The present invention also supports SDH/SONET grooming of channelized payload (i.e., consolidating or segregating traffic to make the data flow more efficient) or concatenated payload (i.e., service signals linked together) functionality. SDH/SONET, being a multiplexing technology, allows for several streams of bits and/or bytes to be multiplexed into a bigger stream, with Overhead (i.e., bits in a digital stream utilized to carry information other than traffic signals) and Payload (i.e., the portion of the signal available for carrying service signals) included. Each stream or channel in SONET is called Synchronous Transport Signal-1, (STS-1), and in SDH, each stream is called Synchronous Transport Module-1 (STM-1). STS-1 stream is 51.84 Mbps bandwidth and STM-1 stream is 155.52 Mbps bandwidth.

The teachings of the present invention can be implemented with discrete components using different chips integrated at a board level. Alternatively, the teachings of the present invention can be implemented using ASIC cores of various components in an ASIC level. Various options are available wherein the ASIC implementation can include an SDH/SONET Framer, Ethernet Media Access Control (MAC) hardware, Ethernet Physical (PHY) hardware, and/or the buffer logic to move data to and from the SDH/SONET Framer to the Ethernet MAC.

FIGS. 1 through 4, wherein like parts are designated by like reference numerals throughout, illustrate example embodiments of a method and apparatus for translating a SONET frame to an Ethernet frame, and vice versa, according to the teachings of the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

The method of the present invention is depicted utilizing a diagrammatic representation of the various elements forming the SDH/SONET and Ethernet networks. FIG. 1 illustrates a schematic representation of the flow of data in an SDH/SONET to Ethernet translation. An SDH/SONET (SDH STM-N or SONET STS-N) frame 101 includes payload data 101A, which represents the data being serviced by the translation method of the present invention. There is additionally a section overhead 101D, representing nine bytes of overhead accessed, generated, and processed by section terminating equipment. The section overhead 101D organizes the framing of the signal, as well as monitors performance. Line overhead 101C represents eighteen bytes of overhead accessed, generated, and processed by line terminating equipment. The line overhead 101C manages functions such as locating the synchronous payload envelope (a SONET structure that carries the payload) in the frame 101, multiplexing or concatenating signals, performance monitoring, automatic protection switching, and line maintenance. Path overhead 101B represents overhead that is accessed, generated, and processed by path terminating equipment. Path overhead 101B includes nine bytes of STS Path Overhead and, if the frame is VT structured, five bytes of VT Path Overhead. An add/drop mechanism 102 can work in conjunction with the SONET frame 101 to add/drop overhead bytes as required by the method of the present invention.

A buffer 103 used to temporarily store data during processing, includes a plurality of STM-1/STS-1 TDM streams, each stream disposed in an STM-1/STS-1 TDM slot 103E through 103F. A plurality of streams is located between slots 103E and 103F, the exact quantity of which is determined by the amount of payload data being serviced.

Each STM-1/STS-1 TDM stream in each STM-1/STS-1 TDM slot 103E through 103F includes a payload data section 103A through 103B. The payload data section 103A serves to temporarily store the data being serviced as it translates from the SDH/SONET frame 101 to an Ethernet frame 105.

Each STM-1/STS-1 TDM slot 103E through 103F has a source MAC address 103G to 103H associated therewith. The source MAC addresses 103G to 103H can be pre-configured in hardware, or configured via an external means. There is also a destination MAC address 103C through 103D associated with each STM-1/STS-1 TDM slot 103E through 103F. The destination MAC addresses 103C through 103D can be configured via an external means. The destination MAC addresses 103C through 103D can be pre-configured, or can be determined at runtime when a packet arrives. The source and destination addresses provide a uni-directional path for the payload data to travel once it arrives at the buffer 103. The source MAC addresses are stored in the Ethernet frame 105 source field 105D during construction of the Ethernet frame 105. The destination MAC addresses are stored in the Ethernet frame 105 destination field 105B during construction of the Ethernet frame 105.

The Ethernet frame 105 also includes a preamble and start of frame delimiter 105C, which is a frame field used to allow a receiver to properly synchronize on the frame before decoding a remainder of the frame. The remainder of the frame being in the form of a data link Ethernet encapsulation. A source field 105D maintains source information of the payload data signal. Payload data 105A represents the data transmitted from the payload data 101A of the SONET frame 101. A frame check sequence 105E is a polynomial code used to detect errors in the Ethernet frame 105.

The SDH/SONET frame 101 can include several STM-1/STS-1 streams multiplexed together into a larger STM-N/STS-N frame, where "N" indicates the number of STM-1/STS-1 streams that are byte interleaved. In the case of SDH, each STM-1 operates at 155.52 Mb/s. In the case of SONET, each STS-1 operates at 51.84 Mb/s.

The data flow between the SDH/SONET frame 101 and the Ethernet frame 105 in accordance with the present invention is illustrated in FIG. 1. To translate the SDH/SONET frame 101 into the Ethernet frame 105, one embodiment of the method of the present invention places the payload data 101A, which excludes Path Overhead (POH) bytes 101B, into the payload data section 105A of the Ethernet frame 105. POH bytes relate to overhead that is accessed, generated, and processed by path terminating equipment. The buffer 103 can buffer the data, if desired. The buffer 103 can also be segregated such that there is one data section 103A through 103B of the buffer 103 per STM-1/STS-1 TDM slot 103E through 103F.

The Ethernet payload data section 105A continues to fill with the payload data from the SDH/SONET frame 101 to the Ethernet frame 105. While the SDH/SONET frame 101 is received, the Ethernet payload data section 105A continues to fill until a maximum data length (e.g., 1500 bytes) is attained. When the Ethernet payload 105A is filled to maximum data length it is transmitted. Incoming SDH/SONET payload 101A is then filled into the Ethernet payload data section 105A of the next Ethernet frame 105 to be generated. If the Ethernet frame's 105 payload data section 105A partially fills, and there is an idle pattern in the SDH/SONET frames 101, the Ethernet frame 105 is transmitted with the frame length. The maximum data length is based on the Ethernet maximum transmission unit configured in the Ethernet hardware.

To translate the Ethernet frame 105 into the SDH/SONET frame 101, the process reverses. The Ethernet payload data section 105A travels to the SDH/SONET payload data section 101A of the SDH/SONET frame 101, as shown in FIG. 1. The buffer 103 can buffer the data. Again, the buffer 103 can be segregated, such that there is one payload data section 103A through 103B of the buffer 103 for each STM-1/STS-1 stream in each STM-1/STS-1 slot 103E through 103F.

When translating the payload data from the Ethernet frame 105 to the SDH/SONET frame 101, the method of the present invention continuously inserts the bits and/or bytes into the SDH/SONET data payload section 101A. The bits/bytes are then transmitted in the next outgoing SDH/SONET frame 101.

SDH/SONET Path Overhead 101B transparency can be achieved by adding or dropping overhead bytes from the SDH/SONET frame 101 using an add/drop mechanism 102 in communication with the SDH/SONET frame 101.

The SDH/SONET path overhead 101B, line overhead 101C (multiplex for SDH), and section overhead 101D (regenerator for SDH), can be dropped off from an incoming SDH/SONET TDM STM-1/STS-1 stream and saved by add/drop mechanism 102, which can be in the form of an ASIC, to be used to support Path, line/multiplex, and section/regenerator transparency. Similarly for the outgoing SDH/SONET TDM frame the corresponding overhead bytes from the path overhead 101B, line overhead 101C (multiplex), and section overhead 101D (regenerator) can be added into the outgoing SDH/SONET frame's 101 overhead bytes by the add/drop mechanism 102. The overhead bytes are managed through some external means, such as being taken from an ingress SDH/SONET port and used by an egress SDH/SONET port via some additional hardware.

Path, multiplex/line and regenerator/section transparency can also be implemented by sending those overhead bytes from the path overhead 101B, line overhead 101C, and section overhead 101D via Ethernet packets to the destination from the source. Once at the destination, the bytes can be reinserted into the SDH/SONET framing by using Framers (not shown) that allow for such capability.

One of ordinary skill in the art will appreciate that the source and destination ports can be any combination of SDH/SONET or Ethernet ports.

Figure 2:
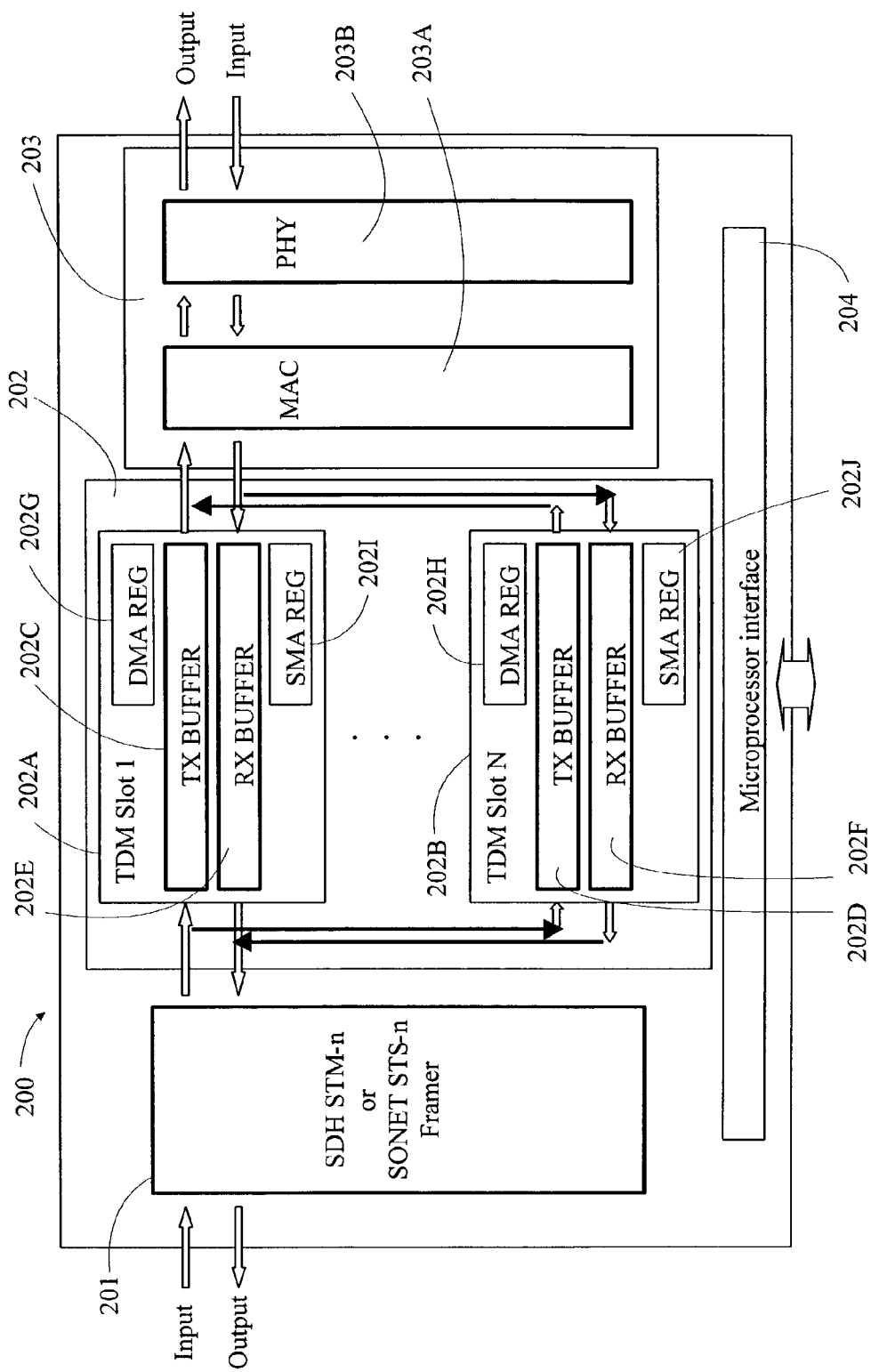
FIG. 2 is a diagrammatic illustration of a hardware architecture for translation of a SDH/SONET frame with channelized payloads to Ethernet frames using one Ethernet framer, according to a first illustrative embodiment of the present invention.
Figure 3:
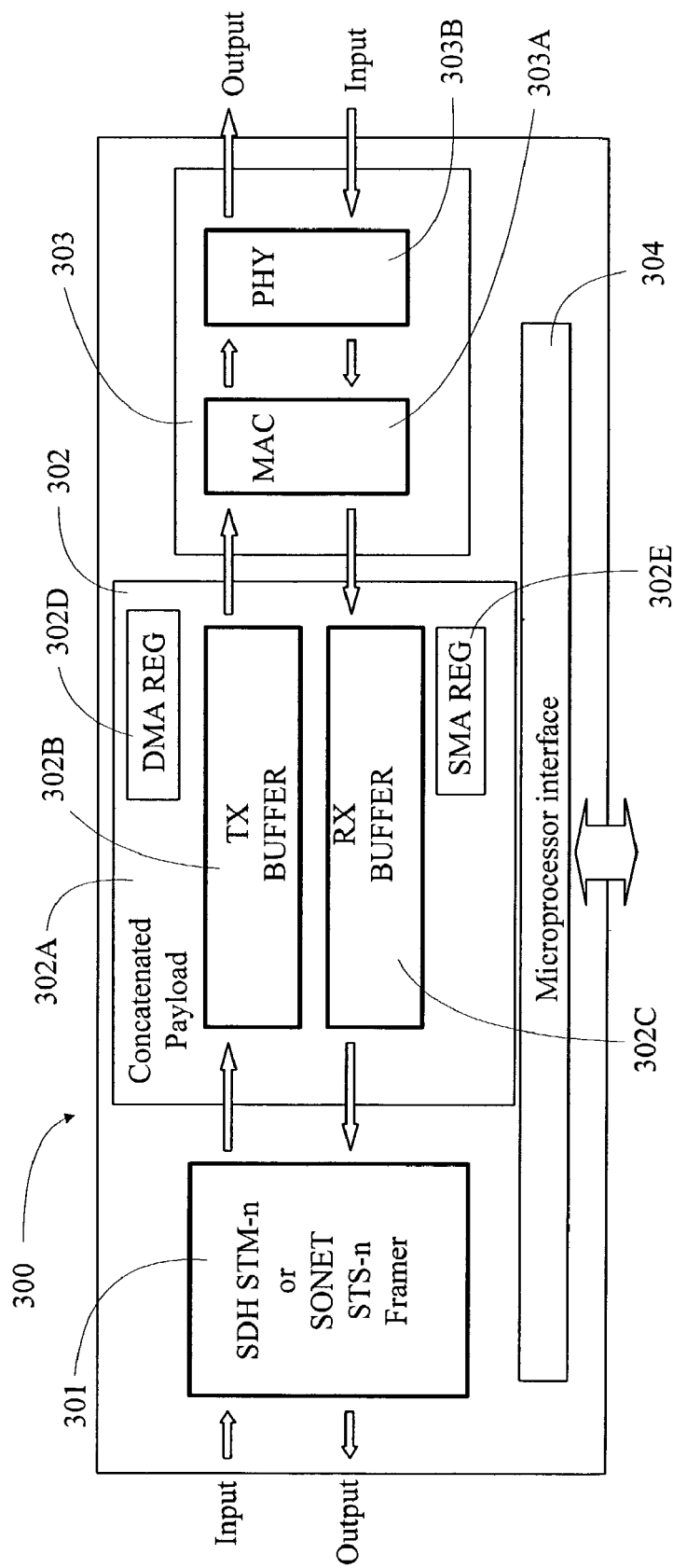
FIG. 3 is a diagrammatic illustration of a hardware architecture for translation of a SDH/SONET frame with concatenated payloads to Ethernet frames using one Ethernet framer, according to a second illustrative embodiment of the present invention.
Figure 4:
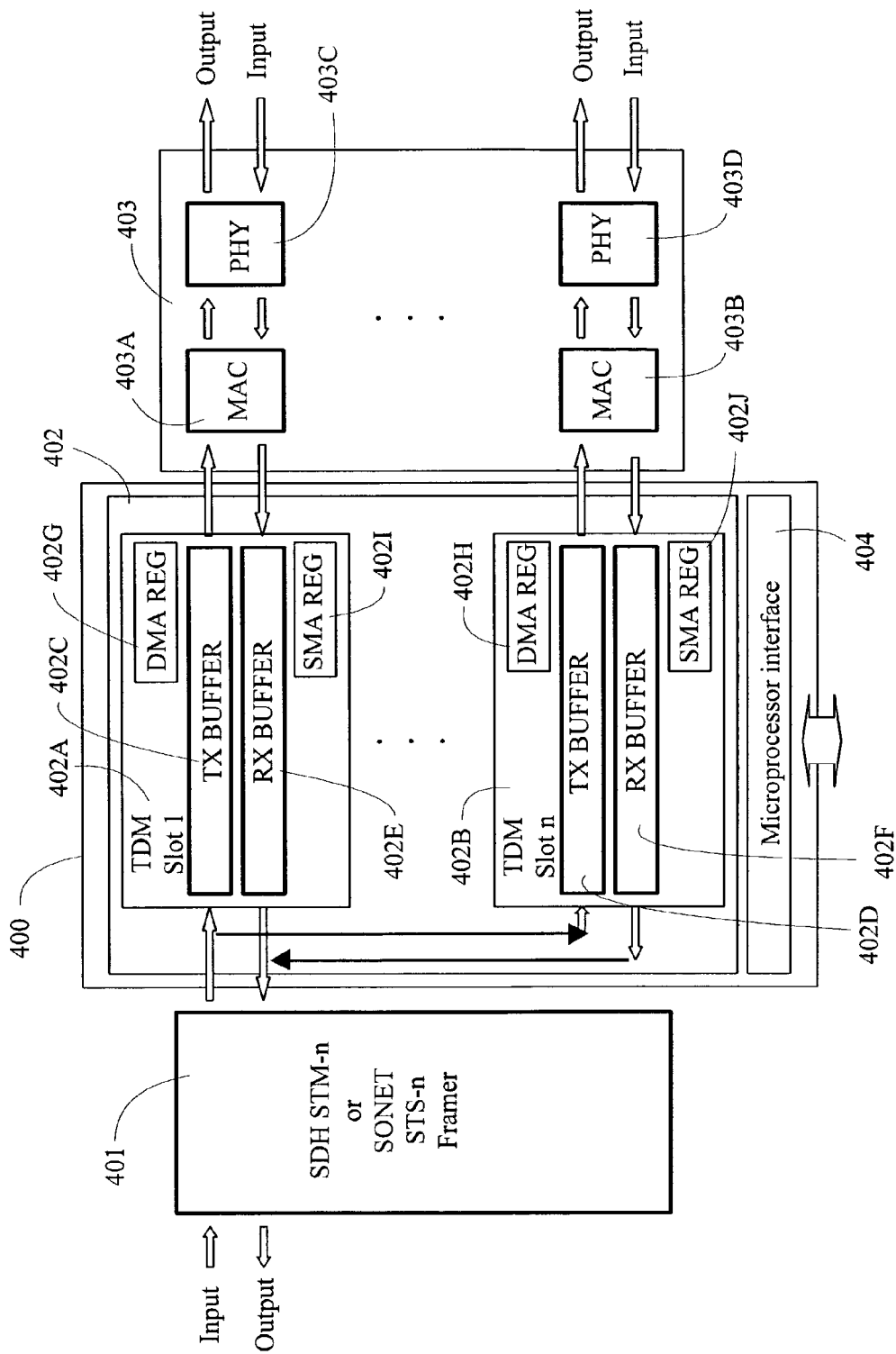
FIG. 4 is a diagrammatic illustration of a hardware architecture for translation of a SDH/SONET frame with channelized payloads to Ethernet frames using "N" Ethernet framers, according to a third illustrative embodiment of the present invention.

There are several possible implementations of the method in accordance with the teachings of the present invention. One example embodiment details how grooming can be supported with one Ethernet Framer (MAC and PHY), as shown in FIG. 2. A second embodiment, shown in FIG. 3, illustrates how concatenation can be supported with a single Ethernet framer. A third embodiment, shown in FIG. 4, illustrates an apparatus in accordance with the teachings of the present invention that supports the translation of channelized signals with multiple Ethernet framers.

Grooming is the consolidation or segregation of traffic to improve efficiency of traffic flow. The data is therefore modified in some manner to consolidate or segregate the data into a more efficient structure for transport. In order to translate a channelized SDH/SONET STM-N/STS-N Frame 101 to an Ethernet Frame 105, each individual STM-1/STS-1 frame within the SDH/SONET STM-N/STS-N frame 101 is translated to its corresponding Ethernet Frame 105.

FIG. 2 illustrates a board 200 for translating SDH/SONET to Ethernet as one embodiment of a translation engine. The board 200 includes an SDH/SONET framer 201, and an Ethernet framer 203. The SDH/SONET framer 201 takes transmitted or received data and encapsulates it into one or more frames (frames 101 from FIG. 1). The Ethernet framer 203 takes transmitted or received data and encapsulates it into frames (frames 105 from FIG. 1). The board 200 further includes an ASIC 202 that maintains transmit buffers 202C through 202D and receive buffers 202E through 202F, which store payload data from the framers 201 and 203. Each SDH/SONET TDM slot 202A through 202B has a transmit buffer 202C through 202D which can store the SDH/SONET frame 101 information and can be used to generate the translated Ethernet frame 105. Each SDH/SONET TDM slot 202A through 202B has a receive buffer 202E through 202F, which can store the Ethernet frame 105 information and can be used to generate the translated SDH/SONET frame 101. An Ethernet MAC chip 203A supports a multiple of MAC addresses required to support mapping of each STS-1/STM-1 TDM slot, while an Ethernet PHY forms the physical interface to the Ethernet for the flow of data.

One SDH/SONET Framer 201 can be used in accordance with one embodiment of the present invention. As in the previous illustration, a plurality of STM-1/STS-1 TDM slots exist between the STM-1/STS-1 TDM slot 202A and the STM-1/STS-1 TDM slot 202B. Each STM-1/STS-1 TDM slot 202A through 202B requires one transmit buffer 202C through 202D and one receive buffer 202E through 202F to store payload data in bytes from each frame (frame 101 or frame 105). The single Ethernet framer 203 with the MAC 203A and PHY 203B hardware devices of the same or higher speed as the SDH/SONET framer 203 can be used in conjunction with the ASIC 202. A microprocessor interface 204 to configure, control, and monitor aspects of the hardware.

In accordance with the embodiment illustrated in FIG. 2, in order to support channelized grooming, a form of mapping is required between each individual STM-1/STS-1 TDM slot 202A through 202B, each of multiple Ethernet destination MAC addresses (DMA) 202G through 202H, and each of multiple source MAC addresses (SMA) 202I through 202J on the Ethernet MAC chip 202A.

In the SDH/SONET to Ethernet direction, the DMA 202G through 202H of the corresponding STM-1/STS-1 TDM slot 202A through 202B is used with the SMA 202I through 202J of the corresponding STM-1/STS-1 TDM slot 202A through 202B. In the Ethernet to SDH/SONET direction the source MAC address 105D of the incoming Ethernet packet 105 can be used to match the SMA 202I through 202J to demultiplex to the corresponding STM-1/STS-1 TDM slot 202A through 202B. The received source MAC address 105D of the incoming Ethernet packet 105 can be used for verification or security, such that if desired, the data can be discarded if the source MAC address 105D of the incoming Ethernet packet 105 does not match the DMA 202G through 202H configured locally.

In accordance with one embodiment of the present invention, the Ethernet MAC hardware 203A is modified to allow for multiple unique Ethernet MAC addresses per MAC device 203A. This allows the single MAC chip to receive frames for multiple specific MAC addresses which have been correspondingly mapped to appropriate STM-1/STS-1 TDM slots 202A through 202B. If not already capable, the MAC hardware 203A also allows for frames created by the ASIC 202 to be transmitted straight through without changing the SMA 202I through 202J and DMA 202G through 202H fields. These modifications allow the system of the present invention to transmit and receive several MAC address frames with one set of MAC and PHY hardware devices 203A and 203B.

In order to translate a concatenated SDH/SONET frame (indicated as STM-Nc/STS-Nc) to an Ethernet frame, the complete concatenated payload is translated to corresponding Ethernet frames. The concatenated STM-Nc/STS-Nc TDM slot 302A requires one transmit buffer 302B and one receive buffer 302C to store the concatenated SDH/SONET payload data in bytes from its concatenated SDH/SONET frame (frame 101) and Ethernet frame (frame 105) and one set of Ethernet MAC 303A and PHY 303B hardware interfaces. FIG. 3 illustrates another embodiment of a translation engine in the form of a board 300 suitable for translating concatenated frames in accordance with one embodiment of the present invention. The board includes an ASIC 302 that maintains transmit buffers 302B and receive buffers 302C, which store payload data from framers 301 and 303. A MAC chip 303A and a PHY hardware interface 303B can be part of the Ethernet framer 303.

The implementation is similar to the translation of the channelized groomed data described above. In the SDH/SONET to Ethernet direction, a destination MAC address (DMA) 302D of a corresponding STM-1/STS-1 TDM slot 302A is used with a source MAC address (SMA) 302E of the corresponding STM-1/STS-1 TDM slot 302A. In the Ethernet to SDH/SONET direction the source MAC address 105D of the incoming Ethernet packet 105 can be used to match the SMA 302E is used for the corresponding STM-1/STS-1 TDM slot 302A. The received source MAC address 105D of the incoming Ethernet packet 105 can be used for verification or security, such that if desired, the data can be discarded if the source MAC address 105D of the incoming Ethernet packet 105 in the particular packet does not match the DMA 302D configured locally.

It should be noted that logically this is a special or base (number of TDM slots=1) case of the previously described embodiment of FIG. 2. Only one TDM slot DMA 302D and SMA 302E is used, and the entire buffer (transmit buffer 302B and receive buffer 302C) is utilized. A microprocessor interface 304 can be used to configure, control, and monitor various aspects of the hardware. The SMA 302E can be the same as the MAC chip's 303A MAC address.

In the above embodiments, the same hardware architecture and implementation can be used with a configurable option in the ASICS 202 and 302 to indicate the implementation of the grooming channelized mode or the concatenated mode.

The implementation of the present invention can be executed by creating a translation engine using standard SDH/SONET Framer hardware, buffer hardware, and Ethernet MAC and PHY hardware. The translation engine can include various forms of these components as separate modules or incorporated into a single module. The translation engine can be implemented using ASIC, Field Programmable Gate Array (FPGA) and/or Network Processor technology. The translation engine can provide support for translating to and from any protocol standards that are used to tunnel or encapsulate Ethernet over SONET (EoS). Such standard protocols include Packet Over SONET (POS), Asynchronous Transfer Mode (ATM), and the like. The translation engine can be configured such that it can provide internetworking between SDH/SONET TDM, SDH/SONET ATM or POS and Ethernet interfaces.

One requirement for practicing the present invention in the SDH/SONET and Ethernet realm is that the technology allow for the implementation of the SDH/SONET framer at certain speeds, such that the Ethernet MAC and PHY chipsets are available at the same, or higher, speeds. Otherwise, the overall translation speed of the resulting device is limited by the speed restriction of one or the other of the framers and the MAC and PHY hardware. Buffering can be used to support differences in speeds between the SDH/SONET and Ethernet hardware. From a hardware perspective, it is likely that the speeds of the various components will keep pace with one another based on the fact that SDH/SONET Framers place more requirements on hardware than Ethernet Framers for the same speed. From a standards perspective, SDH/SONET framers have been specified at multiples of 4 times the previous speed, and Ethernet framers have been specified at multiples of 10 times the previous speed.

The teachings of the present invention can also be utilized with other Ethernet hardware or other technology hardware having similar translation issues. In addition, the present invention can be implemented with the Ethernet chips being configured in half or full duplex mode to function.

In order to translate a groomed channelized STM-N/STS-N frame to Ethernet frames, each individual STM-1/STS-1 frame is translated to corresponding Ethernet frames. An additional translation engine embodiment is illustrated in FIG. 4, wherein a single SDH/SONET Framer 401 is utilized. Each STM-1/STS-1 TDM slot 402A through 402B requires one transmit buffer 402C through 402D and one receive buffer 402E through 402F to store the payload in the form of bytes from a corresponding frame. Each STM-1/STS-1 TDM slot 402A through 402B requires one set of Ethernet MAC hardware 403A through 403B and one set of Ethernet PHY 403C interface hardware through 403D of the same, or higher, speed as the SDH/SONET STM-1/STS-1 TDM stream 402A through 402B. The SMA 302E can be the same as the MAC chip's 303A MAC address. A microprocessor interface 404 configures, controls, and monitors various aspects of the hardware.

In accordance with the teachings of this embodiment, channelized grooming is supported in that a MAC address is associated with each STM-1/STS-1 TDM slot 402A through 402B. An ingress SDH/SONET port STM-1/STS-1 TDM slot can be set up to connect with an egress SDH/SONET port STM-1/STS-1 TDM slot, or another egress Ethernet port. Likewise, an ingress Ethernet port can be set up to connect with an egress SDH/SONET port STM-1/STS-1 TDM slot, or another egress Ethernet port.

Each STM-1 TDM stream operates at 155.52 Mb/s. If possible, by over clocking 10/100 Mb/s Ethernet MAC hardware 403A through 403B and PHY interface hardware 403C through 403D to operate at 155.52 Mb/s, standard Ethernet components can be utilized to implement this embodiment. Because 10/100 Mb/s chipset and cores are available, and relatively inexpensive, they can be utilized to implement the teachings of the present invention. The arrangement of components used to translate SDH can also be used for SONET, because each STS-1 TDM stream operates at 51.84 Mb/s.

A requirement for implementation of this embodiment is that technologies exist to implement the packaging aspects of an ASIC implementation. As the STM-N/STS-N signal levels increase, the number of STM-1/STS-1 streams supported by the signals also increases, which in turn requires a larger number of pins to support the incoming/outgoing STM-1/STS-1 streams and incoming/outgoing Ethernet streams. The ASIC utilized with the present invention must therefore support the larger number of pins.

Several vendors make SDH/SONET Framers and MAC and PHY hardware components that can be utilized in accordance with the teachings of the present invention. Venders such as Applied Micro Circuits Corporation (AMCC) of San Diego, Calif., PMC-Sierra, Inc. of Burnaby, British Columbia, Agere Systems of Allentown, Pa., Vitesse Semiconductor Corporation of Camarillo, Calif., and Intel Corporation of Santa Clara, Calif. make SDH/SONET Framer and/or Ethernet device products. SDH/SONET framer products from AMCC include 4802 Missouri Chip, 19202 Ganges Chip, and 4801 Amazon Chip. Intel products include the SONET/SDH Framer IXF6048/6012 and Ethernet MAC IXF440/IXF1002. There is an Intel Ethernet PHY LTX family of products. Vitesse provides an additional SONET/SDH Framer VSC91xx Product Family.

An example implementation of the embodiment depicted in FIG. 2 can be executed as follows. The AMCC 4801 Missouri Chip can be used for the SDH/SONET framer 201. The Intel IXF1002 MAC Chip can form the MAC chip 203A and the LTX1000 PHY chip can form the PHY 203B hardware. The ASIC 202 is then custom designed in accordance with the layout depicted in FIG. 2.

Because the present invention utilizes a method of translation, the present invention utilizes bandwidth more efficiently by sending only the payload bytes of the protocol. The present invention is also useful in that it supports translation of channelized groomed SDH/SONET frames. The present invention allows for SONET over Ethernet translation, which takes advantage of Ethernet's bandwidth efficiency. The method of the present invention supports the translation of a circuit having a first port of one type (e.g., SDH/SONET) to a second port of a different type (e.g., Ethernet). Thus, SDH/SONET and Ethernet devices can coexist in a single managed network, and do so through use of an efficient process for translating payload from one port to the other.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the appended claims is reserved. It is intended that the present invention be limited only to the extent required by the applicable rules of law.

What is claimed is:

1. A translation system for translation between SDH/SONET frames and Ethernet frames for transportation to and from an Ethernet Network, the system comprising:
    a buffer for holding SDH/SONET frames for translation;
    one or more SDH/SONET TDM slots within the buffer and each having an associated Ethernet Media Access Control (MAC) address, such that an associated Ethernet frame can be generated;
    a translation engine in communication with the buffer for directly mapping SDH/SONET payload or SDH/SONET overhead of SDH/SONET frames into a data field of Ethernet frames containing translated data resulting from packetizing SDH/SONET payload or SDH/SONET Overhead using Ethernet frames; and
    a plurality of interfaces in communication with the translation engine and structured for transmission of the Ethernet frames containing the translated data.

2. The translation system of claim 1, further comprising an SDH/SONET frame overhead add/drop mechanism in communication with the SDH/SONET frames for adding or dropping SDH/SONET frame overhead bytes to transport the SDH/SONET frame overhead to and from the Ethernet Network.

3. The translation system of claim 2, wherein the SDH/SONET frame overhead add/drop mechanism comprises at least one of an ASIC, a Field Programmable Gate Array (FPGA), or a Network Processor.

4. The translation system of claim 1, wherein the translation engine comprises at least one of an ASIC, an FPGA, or a Network Processor in communication with an SDH/SONET Framer, Ethernet MAC hardware, Ethernet physical hardware, and buffer logic to move the SDH/SONET frames and the Ethernet frames to and from the SDH/SONET Framer and the Ethernet MAC hardware.

5. The translation system of claim 4, wherein the Ethernet MAC hardware is modified to support a single Ethernet MAC hardware device configured with multiple unique unicast Ethernet MAC addresses to receive valid Ethernet MAC frames.

6. The translation system of claim 4, wherein the Ethernet MAC hardware allows frames to be transmitted without changing Source MAC Address or Destination MAC Address fields.

7. The translation system of claim 1, wherein the payload data comprises SDH/SONET traffic that is at least one of channelized or concatenated SDH/SONET frames.

8. A translation system for translation between Ethernet frames and SDH/SONET frames for transportation to and from an Ethernet Network, the system comprising:
    a buffer for holding Ethernet frames for translation;
    one or more SDH/SONET TDM slots within the buffer and each having an associated Ethernet MAC address, such that an a associated Ethernet frame can be received;
    a translation engine in communication with the buffer for directly mapping only a data field of Ethernet frames into SDH/SONET payload data or SDH/SONET overhead of SDH/SONET frames containing translated data resulting from packetized SDH/SONET payload or SDH/SONET Overhead using Ethernet frames; and
    a plurality of interfaces in communication with the translation engine and structured for reception of Ethernet frames for translation to SDH/SONET frames containing the translated data.

9. The translation system of claim 8, further comprising an SDH/SONET frame overhead add/drop mechanism in communication with the SDH/SONET frames for adding or dropping SDH/SONET frame overhead bytes.

10. The translation system of claim 9, wherein the SDH/SONET frame overhead add/drop mechanism comprises at least one of an ASIC, an FPGA, or a Network Processor.

11. The translation system of claim 8, wherein the translation engine comprises at least one of an ASIC, an FPGA, or a Network Processor in communication with an SDH/SONET Framer, Ethernet MAC hardware, Ethernet physical hardware, and buffer logic to move the SDH/SONET frames and Ethernet frames to and from the SDH/SONET Framer and the Ethernet MAC hardware.

12. The translation system of claim 11, wherein the Ethernet MAC hardware is modified to support a single Ethernet MAC hardware device configured with multiple unique unicast Ethernet MAC addresses to receive valid Ethernet MAC frames.

13. The translation system of claim 11, wherein the Ethernet MAC hardware allows frames to be transmitted without changing Source MAC Address or Destination MAC Address fields.

14. The translation system of claim 8, wherein the payload data at the SDH/SONET frames comprises SDH/SONET traffic that is at least one of channelized or concatenated SDH/SONET frames.

15. A method of translating payload data from SDH/SONET frames to Ethernet frames for transportation to and from an Ethernet Network, the method comprising the steps of:
    providing an SDH/SONET payload; and
    sending the SDH/SONET payload through a translation engine of a translation system to directly map SDH/SONET payload to an Ethernet payload by packetizing SDH/SONET payload or SDH/SONET Overhead using Ethernet frames;
    wherein the translation system comprises one or more SDH/SONET TDM slots within a buffer and each having an associated Ethernet Media Access Control (MAC) address.

16. The method of claim 15, wherein the SDH/SONET payload passes through the buffer.

17. The method of claim 15, wherein the translation engine comprises at least one of an ASIC, an FPGA, or a Network Processor in communication with an SDH/SONET Framer, Ethernet MAC hardware, Ethernet physical hardware, and buffer logic to move the payload data to and from the SDH/SONET Framer and the Ethernet MAC hardware.

18. The method of claim 17, wherein the Ethernet MAC hardware is modified to support a single Ethernet MAC hardware device configured with multiple unique unicast Ethernet MAC addresses to receive valid Ethernet MAC frames.

19. The method of claim 17, wherein the Ethernet MAC hardware allows frames to be transmitted without changing Source MAC Address or Destination MAC Address fields.

20. The method of claim 15, wherein the payload comprises SDH/SONET traffic that is at least one of channelized or concatenated SDH/SONET frames.

21. A method of translating payload data Ethernet frames to SDH/SONET frames for transportation to and from an Ethernet Network, the method comprising the steps of:
   providing an Ethernet payload; and
   sending the Ethernet payload through a translation engine of a translation system to directly map only the Ethernet payload to an SDH/SONET payload from packetized SDH/SONET payload or SDH/SONET Overhead using Ethernet frames;
   wherein the translation system comprises one or more SDH/SONET TDM slots within a buffer and each having an associated Ethernet Media Access Control (MAC) address.

22. The method of claim 21, wherein the Ethernet payload passes through the buffer.

23. The method of claim 21, wherein the translation engine comprises at least one of an ASIC, an FPGA, or a Network Processor in communication with an SDH/SONET Framer, Ethernet MAC hardware, Ethernet physical hardware, and buffer logic to move the payload data to and from the SDH/SONET Framer and the Ethernet MAC hardware.

24. The method of claim 23, wherein the Ethernet MAC hardware is modified to support a single Ethernet MAC hardware device configured with multiple unique unicast Ethernet MAC addresses to receive valid Ethernet MAC frames.

25. The method of claim 23, wherein the Ethernet MAC hardware allows frames to be transmitted without changing Source MAC Address or Destination MAC Address fields.

26. The method of claim 21, wherein the payload at the SDH/SONET payload destination comprises SDH/SONET traffic that is at least one of channelized or concatenated SDH/SONET frames.

27. A method of translating an SDH/SONET frame to an Ethernet frame for transportation to and from an Ethernet Network, comprising:
   the SDH/SONET frame entering a translation system at an SDH/SONET interface element;
   a translation engine within the translation system processing the SDH/SONET frame to directly map SDH/SONET payload or SDH/SONET overhead of the SDH/SONET frame to a data field of the Ethernet frame by packetizing the SDH/SONET payload or SDH/SONET Overhead using Ethernet frames; and
   transmitting the Ethernet frame from the translation system through an Ethernet interface element;
   wherein the translation system comprises one or more SDH/SONET TDM slots within a buffer and each having an associated Ethernet Media Access Control (MAC) address.

28. The method of claim 27, wherein the buffer stores the Ethernet frame information.

29. The method of claim 27, wherein the SDH/SONET frame comprises payload data in the form of SDH/SONET traffic that is at least one of channelized or concatenated SDH/SONET frames.

30. A method of translating an Ethernet frame to an SDH/SONET frame for transportation to and from an Ethernet Network, the method comprising:
   the Ethernet frame entering a translation system at an Ethernet interface element;
   a translation engine within the translation system processing the Ethernet frame to directly map only a data field of the Ethernet frame to SDH/SONET payload or SDH/SONET overhead of the SDH/SONET frame resulting from packetized SDH/SONET payload or SDH/SONET Overhead using Ethernet frames; and
   transmitting the SDH/SONET frame from the translation system through an SDH/SONET interface element;
   wherein the translation system comprises one or more SDH/SONET TDM slots within a buffer and each having an associated Ethernet Media Access Control (MAC) address.

31. The method of claim 30, wherein the buffer stores SDH/SONET frame information.

32. The method of claim 30, wherein the SDH/SONET frame comprises payload data in the form of SDH/SONET traffic that is at least one of channelized or concatenated SDH/SONET frames.

* * * * *

UNITED STATES PATENT AND TRADEMARK OFFICE
CERTIFICATE OF CORRECTION

PATENT NO. : 7,586,941 B2
APPLICATION NO. : 10/228502
DATED : September 8, 2009
INVENTOR(S) : Rumi S. Gonda It is certified that error appears in the above-identified patent and that said Letters Patent is hereby corrected as shown below:

In claim 8, line 65, the word "a" should be deleted;

In claim 15, line 41, the word --the-- should be added after "map"; and

In claim 31, line 33, the word --the-- should be added after "stores".

Signed and Sealed this

Eighth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,586,941 B2
APPLICATION NO. : 10/228502
DATED : September 8, 2009
INVENTOR(S) : Rumi S. Gonda It is certified that error appears in the above-identified patent and that said Letters Patent is hereby corrected as shown below:

Column 11, In claim 8, line 65, the word "a" should be deleted;

Column 12, In claim 15, line 41, the word --the-- should be added after "map"; and Column 14, In claim 31, line 33, the word --the-- should be added after "stores".

This certificate supersedes the Certificate of Correction issued December 8, 2009.

Signed and Sealed this

Twenty-sixth Day of January, 2010

David J. Kappos
*Director of the United States Patent and Trademark Office*